United States Patent
Kishimoto

(10) Patent No.: US 7,072,019 B1
(45) Date of Patent: *Jul. 4, 2006

(54) LIQUID CRYSTAL DISPLAY DEVICE AND METHOD FOR FABRICATING THE SAME

(75) Inventor: Katsuhiko Kishimoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 556 days.

This patent is subject to a terminal disclaimer.

(21) Appl. No.: 09/604,677

(22) Filed: Jun. 27, 2000

(30) Foreign Application Priority Data

Jun. 30, 1999 (JP) .......................................... 11-186494
May 19, 2000 (JP) ....................................... 2000-147206

(51) Int. Cl.
  *G02F 1/1339* (2006.01)
  *G02F 1/1337* (2006.01)

(52) U.S. Cl. ................... 349/156; 349/130; 349/155
(58) Field of Classification Search ............... 349/129, 349/155–158, 183, 130
See application file for complete search history.

(56) References Cited

U.S. PATENT DOCUMENTS

| | | | |
|---|---|---|---|
| 5,473,450 A | 12/1995 | Yamada et al. | 349/84 |
| 5,706,109 A | 1/1998 | Yamada et al. | 349/181 |
| 5,726,728 A * | 3/1998 | Kondo et al. | 349/156 |
| 6,072,557 A * | 6/2000 | Kishimoto | 349/156 |
| 6,330,049 B1 * | 12/2001 | Kume et al. | 349/156 |
| 6,721,024 B1 * | 4/2004 | Kishimoto et al. | 349/123 |

FOREIGN PATENT DOCUMENTS

| | | | |
|---|---|---|---|
| EP | 0 854 377 A2 | | 7/1998 |
| JP | 63-64023 | * | 3/1988 |
| JP | 6-301015 A | | 10/1994 |
| JP | 7-120728 A | | 5/1995 |
| JP | 8-95054 A | | 4/1996 |
| JP | 10-1866330 A | | 7/1998 |

* cited by examiner

*Primary Examiner*—Dung T. Nguyen
(74) *Attorney, Agent, or Firm*—Nixon & Vanderhye P.C.

(57) ABSTRACT

The liquid crystal display device of the present invention includes: a first substrate; a second substrate; a liquid crystal layer sandwiched by the first and second substrates; and wall structures formed on a surface of the first substrate facing the liquid crystal layer for dividing the liquid crystal layer into a plurality of liquid crystal regions. Liquid crystal molecules in the plurality of liquid crystal regions are aligned axially symmetrically with respect to an axis vertical to a surface of the first substrate. The liquid crystal regions have a shape of a polygon having dulled corners. The alignment direction of the liquid crystal molecules in the liquid crystal regions with respect to side faces of the wall structures in the corners changes continuously.

22 Claims, 10 Drawing Sheets

Curve P having a radium of curvature not larger than R'

Circle circumscribing a polygon of liquid crystal region 230a (radium R')

LIQUID CRYSTAL DISPLAY DEVICE AND METHOD FOR FABRICATING THE SAME

BACKGROUND OF THE INVENTION

The present invention relates to a liquid crystal display device and a method for fabricating the same. More particularly, the present invention relates to a liquid crystal display device where liquid crystal molecules are aligned axially symmetrically in liquid crystal regions separated from one another by wall structures.

Conventionally, twisted nematic (TN) and super-twisted nematic (STN) liquid crystal display devices (LCDS) are used as display devices utilizing the electrooptic effect. In order to widen the viewing angle of these LCDS, various techniques are now under vigorous development.

As one of the viewing angle widening techniques proposed so far, Japanese Laid-Open Patent Publication No. 6-301015 and No. 7-120728 disclose a so-called axially symmetrically aligned microcell (ASM) mode LCD where liquid crystal molecules are aligned axially symmetrically in respective liquid crystal regions separated from one another by polymer walls. Each liquid crystal region substantially surrounded by the polymer walls is typically formed for each pixel. Since the liquid crystal molecules are aligned axially symmetrically, such an ASM mode LCD provides a wide viewing angle characteristic where change in a contrast ratio is small whichever direction an observer views the LCD.

The ASM mode LCDs disclosed in the above publications are fabricated by subjecting a mixture of a polymeric material and a liquid crystal material to polymerization induced phase separation.

A method for fabricating a conventional ASM mode LCD will be described with reference to FIG. 9. First, in step (a) shown in FIG. 9, a glass substrate 908 having a color filter and an electrode formed on one surface is prepared. The color filter and the electrode formed on the glass substrate 908 are not shown in FIG. 9 for simplification. Formation of the color filter is described hereinafter.

In step (b), polymer walls 917 for axially symmetrical alignment of liquid crystal molecules are formed in a lattice shape, for example, on the surface of the glass substrate 908 on which the color filter and the electrode are formed. Specifically, a photosensitive resin material is spin-coated on the glass substrate 908, exposed to light via a photomask having a predetermined pattern, and developed to form lattice-shaped polymer walls. The photosensitive resin material may be negative or positive. A non-photosensitive resin material may also be used although a step of forming a resist film is additionally required.

In step (c), column protrusions 920 are formed on the top faces of the resultant polymer walls 917 by dispersive patterning. The column protrusions 920 are obtained by exposing to light and developing a photosensitive resin material as in the polymer walls.

In step (d), the surface of the glass substrate 908 with the polymer walls 917 and the column protrusions 920 formed thereon is coated with a vertical alignment material 921 such as polyimide. Meanwhile, in steps (e) and (f), the surface of a counter substrate 902 on which an electrode is formed is also coated with the vertical alignment material 921.

In step (g), the resultant two substrates are bonded together with the surfaces thereof on which the electrode is formed facing each other, to form a liquid crystal cell. The gap between the two substrates (cell gap, i.e., the thickness of a liquid crystal layer) is defined by the sum of the height of the polymer walls 917 and the height of the column protrusions 920.

In step (h), a liquid crystal material is injected into the resultant cell gap by a vacuum injection method or the like. Finally, in step (i), a voltage is applied between a pair of opposing electrodes to align liquid crystal molecules axially symmetrically in each liquid crystal region 916. That is, liquid crystal molecules in the liquid crystal region 916 defined by the polymer walls 917 are aligned axially symmetrically with respect to an axis 918 (vertical to the substrates) shown by the dashed line in FIG. 9.

FIG. 10 shows a cross-sectional structure of a conventional color filter. The color filter includes colored resin sections of red (R), green (G), and blue (B) corresponding to respective pixels and a black matrix (BM) film for light-shading the gaps between the colored resin sections, which are formed on a glass substrate. The colored resin sections and the BM film are covered with an overcoat (OC) layer made of an acrylic resin or an epoxy resin having a thickness of about 0.5 to 2.0 μm for improving the smoothness and the like. The OC layer is then covered with an indium tin oxide (ITO) film as a transparent signal electrode. The BM film is generally made of a metal chromium film having a thickness of about 100 to 150 nm. The colored resin sections are made of resin materials colored with a dye or a pigment and generally have a thickness of about 1 to 3 μm.

The color filter is formed by patterning photosensitive colored resin layers formed on the substrate by photolithography. For example, R, G, and B photosensitive resin materials are individually subjected to the process of layer formation, light exposure, and development (the process is done total three times), to form the R, G, and B color filter sections. Each photosensitive colored resin layer can be formed by applying a liquid photosensitive colored resin material (obtained by diluting the material with a solvent) to the substrate by spin coating or the like, by transferring a dry film of a photosensitive colored resin material, or other methods. Using the thus-formed color filter, the ASM mode color LCD described above having a wide viewing angle characteristic is obtained.

However, the inventor of the present invention has found that the conventional ASM mode LCD has the following problem.

FIGS. 11A and 11B are plan views of a conventional ASM mode LCD (viewed from the direction normal to the display plane): FIG. 11A schematically illustrates a corner of a liquid crystal region and the orientation state of liquid crystal molecules; and FIG. 11B schematically illustrates the arrangement of a plurality of liquid crystal regions. As shown in FIGS. 11A and 11B, in the conventional ASM mode LCD, polymer walls 917 (wall structures) for aligning liquid crystal molecules axially symmetrically are formed in a lattice shape defining rectangular liquid crystal regions 916. It has been found from examinations performed by the inventor that the right-angle corners of the rectangular liquid crystal regions 916 possess a degree of steepness that is not negligible for the liquid crystal molecules in consideration of the size of the molecules. Therefore, in a corner 917a of the liquid crystal region 916, the alignment direction of the liquid crystal molecules with respect to the surface of polymer walls 917 is irregular as shown in FIG. 11A, losing continuity in the alignment of the liquid crystal molecules. This may cause a variation in the viewing angle characteristic of the liquid crystal display device and result in rough display.

In order to avoid the disturbance in the alignment of the liquid crystal molecules in the periphery of each liquid crystal region (near the polymer walls) from influencing the display, a black matrix is conventionally formed to shade light transmitted through the periphery (including the corners) of the liquid crystal region. This formation of the black matrix minimizes roughness of display, but lowers the aperture ratio. That is, the brightness is sacrificed.

SUMMARY OF THE INVENTION

An object of the present invention is providing a liquid crystal display device that has a wide viewing angle characteristic and permits bright high-quality display free from roughness, and a method for fabricating such a liquid crystal display device.

The liquid crystal display device of the present invention includes: a first substrate; a second substrate; a liquid crystal layer sandwiched by the first and second substrates; and wall structures formed on a surface of the first substrate facing the liquid crystal layer for dividing the liquid crystal layer into a plurality of liquid crystal regions, wherein liquid crystal molecules in the plurality of liquid crystal regions are aligned axially symmetrically with respect to an axis vertical to a surface of the first substrate, the liquid crystal regions have a shape of a polygon having dulled corners, and the alignment direction of the liquid crystal molecules in the liquid crystal regions with respect to side faces of the wall structures in the corners changes continuously.

The shape of the dulled corners is preferably a curve. For example, the curve may be an arc.

Preferably, the shape of the dulled corners is a curve having a radius of curvature R, and the radius of curvature R has a relationship of R>lm wherein lm denotes a molecule length of the liquid crystal molecules.

Preferably, the radius of curvature R of the curve constituting the shape of the dulled corners has a relationship of R≦R' wherein R' denotes a radium of a circle circumscribing the polygon of the liquid crystal region.

The wall structures are preferably formed of a negative photosensitive resin.

The liquid crystal molecules in the liquid crystal regions are preferably aligned vertical to side faces of the wall structures.

The method of the present invention is a method for fabricating a liquid crystal display device including: a first substrate; a second substrate; a liquid crystal layer sandwiched by the first and second substrates; and wall structures formed on a surface of the first substrate facing the liquid crystal layer for dividing the liquid crystal layer into a plurality of liquid crystal regions. The method includes the steps of: forming a negative photosensitive resin layer on the first substrate; subjecting the negative photosensitive resin layer to excessive light exposure via a mask having polygonal light-shading portions; and developing the exposed negative photosensitive resin layer, to form the wall structures that surround regions having a shape of the polygon of the light shading portions where corners of the polygon are dulled.

According to the present invention, in the ASM mode LCD, the corners of the polygonal liquid crystal regions substantially surrounded by the wall structures are dulled. Therefore, the alignment of the liquid crystal molecules changes continuously in the corners of the liquid crystal regions. This prevents occurrence of an alignment disturbance of the liquid crystal molecules, and thus minimizes the variation in the viewing angle characteristic of display and eliminates the necessity of shading the alignment disturbance with the black matrix. As a result, a liquid crystal display device having a wide viewing angle characteristic and providing bright, high-quality display free from roughness is obtained. The alignment of the liquid crystal molecules is further stabilized if the corners have a shape of a curve. The effect of stabilizing the alignment of the liquid crystal molecules is great if the liquid crystal molecules are aligned vertical to the side faces of the wall structures.

A negative photosensitive resin is used for the formation of the wall structures. By adopting this construction, a liquid crystal display device can be easily fabricated by changing the exposure amount in the light exposure step in the conventional process of forming the wall structures (polymer walls). More concretely, in the formation of the wall structures using a negative photosensitive resin, the negative photosensitive resin may be subjected to excessive light exposure via a mask having polygonal light-shading portions. By only this excessive light exposure, the corners of the regions substantially surrounded by the wall structures can be shaped into a curve.

BRIEF DESCRIPTION OF THE DRAWINGS

FIGS. 2A and 2B show the state where a voltage is not applied (voltage non-applied state), and FIGS. 2C and 2D show the state where a voltage is applied (voltage applied state).

FIG. 11B illustrates the arrangement of a plurality of liquid crystal regions.

DESCRIPTION OF THE PREFERRED EMBODIMENTS

Hereinafter, preferred embodiments of the present invention will be described with reference to the accompanying drawings.

Embodiment 1

Figure 1A:
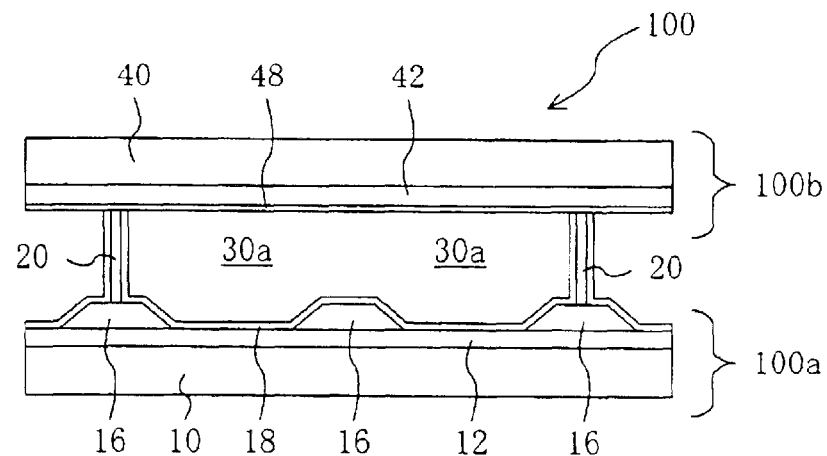
FIGS. 1A and 1B are a cross-sectional view and a plan view, respectively, schematically illustrating a liquid crystal display device (LCD) of EMBODIMENT 1 of the present invention.
Figure 1B:
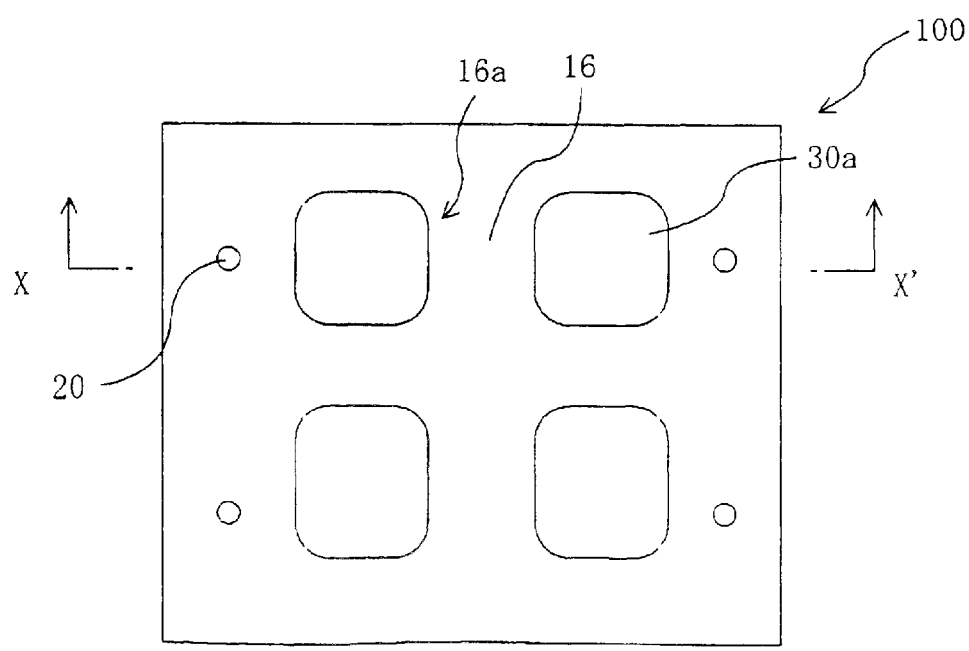

A liquid crystal display device (LCD) 100 of EMBODIMENT 1 of the present invention is schematically shown in FIGS. 1A and 1B: FIG. 1A is a cross-sectional view of the LCD 100 taken along line X–X' of FIG. 1B which is a plan view thereof (viewed from the direction normal to the substrate plane). In EMBODIMENT 1, a construction using a liquid crystal material having negative dielectric anisotropy and a vertical alignment film is exemplified. It should however be noted that this embodiment is not limited to this construction.

The LCD 100 includes a first substrate 100a, a second substrate 100b, and a liquid crystal layer 30 sandwiched by the two substrates. The liquid crystal layer 30 includes liquid crystal molecules (not shown) having negative dielectric anisotropy. The first substrate 100a is constructed as follows. A first transparent electrode 12 made of ITO or the like is formed on the surface of a first transparent substrate made of glass or the like facing the liquid crystal layer 30. Wall structures 16 made of a resin material, for example, are formed on the first transparent electrode 12. The wall structures 16 can also be formed using an inorganic material such as $SiO_2$. Using a resin material however facilitates the formation of the wall structures 16. A transparent resin material is preferably used because the portions of the liquid crystal layer located above the wall structures 16 are made contributable to display.

The wall structures 16 partition the liquid crystal layer 30 into a plurality of liquid crystal regions 30a and also serve to orientate liquid crystal molecules axially symmetrically in the liquid crystal regions 30a. In other words, as shown in FIG. 1B, the liquid crystal regions 30a are defined by the wall structures 16, and the wall structures 16 substantially surround the liquid crystal regions 30a. The wall structures 16 of the LCD of the present invention extend in two directions intersecting with each other, defining the liquid crystal regions 30a in a rough polygonal shape. Corners 16a of the polygon (typically a rectangle corresponding to each pixel) of each region to each pixel) of each region substantially surrounded by the wall structures 16 are dulled. Dulling a corner as used herein refers to having a corner constituted by an angle (or angles) exceeding 90 degrees or a curve. The corner may also be constituted by a combination of an obtuse angle and a curve.

On the wall structures 16, column protrusions 20 are selectively formed for defining the thickness of the liquid crystal layer 30 (cell gap). A vertical alignment film 18 is formed on the surface of the resultant first substrate 100a facing the liquid crystal layer 30 covering at least the first transparent electrode 12 and the transparent wall structures 16, for orientating liquid crystal molecules (not shown) in the liquid crystal layer 30.

The second substrate 100b is constructed as follows. A second transparent electrode 42 made of ITO or the like is formed on the surface of a second transparent substrate 40 made of glass or the like facing the liquid crystal layer 30. A vertical alignment film 48 is formed covering the second transparent electrode 42. In the illustrated example, the wall structures 16 are formed in a lattice shape in correspondence with the pixel regions. The arrangement of the wall structures 16 is however not limited to the illustrated one. The column protrusions 20 may be formed at an appropriate density so that a sufficient strength is provided.

The first electrode 12 and the second electrode 42 may be constructed in a known manner and may drive the liquid crystal layer 30 by a known driving method. For example, an active matrix type or a simple matrix type may be adopted. Alternatively, a plasma addressing type may be adopted, where a plasma discharge channel is provided in place of either one of the first electrode 12 and the second electrode 42. The first substrate and the second substrate may be interchanged with each other depending on the electrode construction and the driving method adopted. That is, the second substrate may have the transparent wall structures 16 and the column protrusions 20.

Figure 2A:
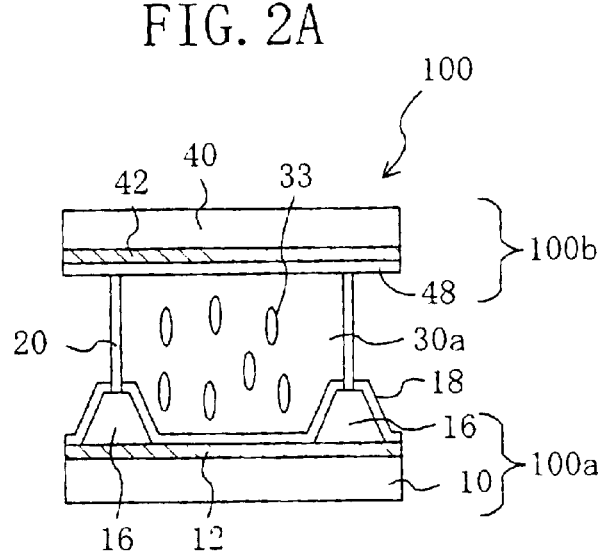
FIGS. 2A, 2B, 2C, and 2D are schematic illustrations of an ASM mode LCD used to describe the operation of the LCD, where
Figure 2C:
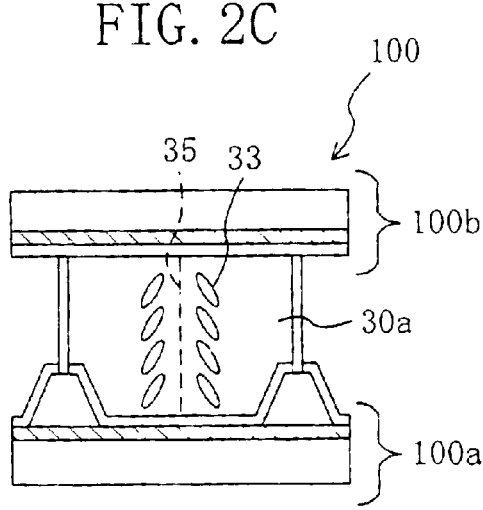
Figure 2B:
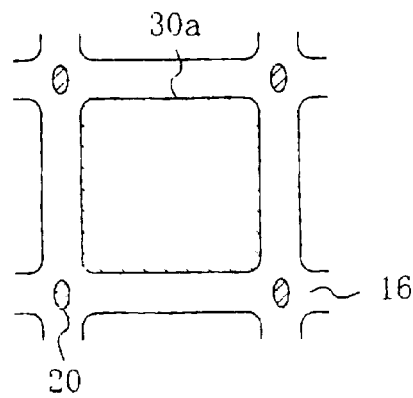
Figure 2D:
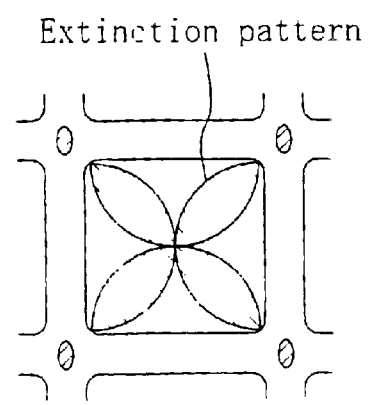

The operation of the LCD 100 of this embodiment will be described with reference to FIGS. 2A through 2D. Referring to FIG. 2A, in the state where no voltage is applied to the liquid crystal region 30a, liquid crystal molecules 33 are aligned vertical to the substrate plane by the alignment regulating force possessed by the vertical alignment films 18 and 48 formed on the surfaces of the substrates 100a and 100b facing the liquid crystal layer 30. FIG. 2B shows this state observed with a crossed-Nicols state polarizing microscope, where a dark field is exhibited (in the normally-black mode). Once a voltage for gray scale display is applied to the liquid crystal region 30a, a force for aligning the major axis of the molecules vertical to the direction of the electric field is exerted to the liquid crystal molecules 33 having negative dielectric anisotropy. As a result, as shown in FIG. 2C, the major axis of the molecules is tilted from the direction vertical to the substrate plane (gray scale display state). At this time, the liquid crystal molecules 33 in the liquid crystal region 30a are aligned axially symmetrically with respect to a center axis 35 shown by the dashed line in FIG. 2C by the existence of the wall structures 16. FIG. 2D shows this state observed with a crossed-Nicols state polarizing microscope, where an extinction pattern is observed in the directions along the polarizing axes.

Figure 3B:
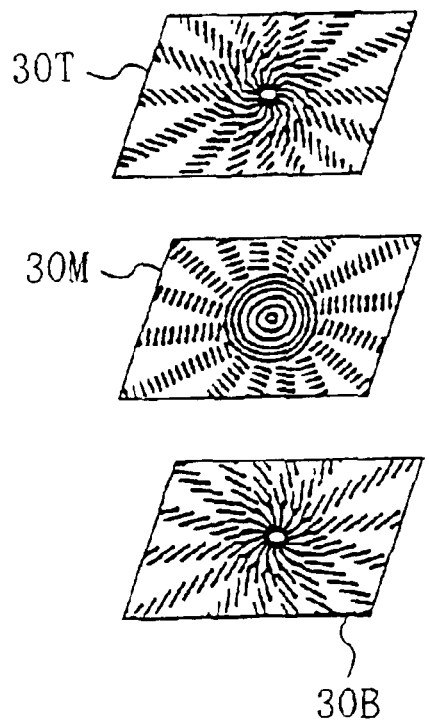
FIGS. 3A and 3B are schematic views illustrating the axially symmetrical orientation states of liquid crystal molecules in a liquid crystal region.
Figure 3A:
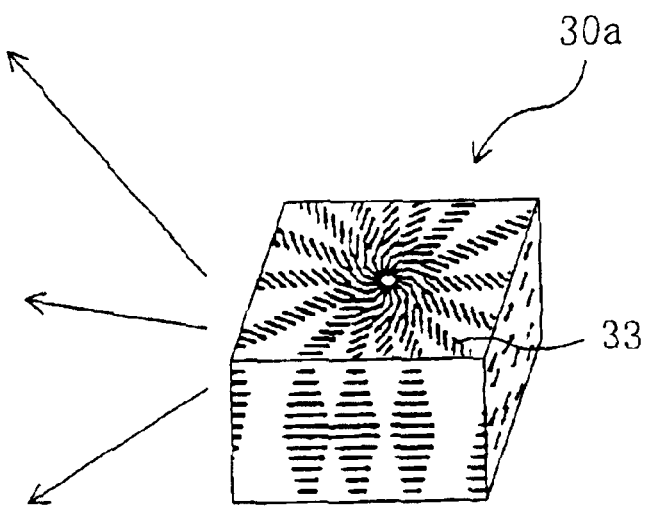

The axially symmetrical alignment as used herein includes tangential and radial alignments. Spiral alignment shown in FIGS. 3A and 3B is also included. The spiral alignment shown in FIGS. 3A and 3B is obtained by adding a chiral agent to a liquid crystal material to provide a twisting force. Liquid crystal molecules in the liquid crystal region 30a shown in FIG. 3A are aligned spirally in a top portion 30T and a bottom portion 30B as shown in FIG. 3B while they are aligned tangentially in a middle portion 30M. The liquid crystal molecules have therefore twisted in the thickness direction of the liquid crystal layer. The center axis for this axially symmetrical alignment is normally substantially identical to the normal to the substrate.

The axially symmetrical alignment of liquid crystal molecules improves the viewing angle characteristic. More specifically, when liquid crystal molecules are aligned axially symmetrically, the refractive index anisotropy of the liquid crystal molecules is averaged over azimuthal directions. This solves the problem arising in the gray scale display state of the conventional TN mode LCD that the viewing angle characteristic varies considerably depending on the azimuthal direction. If a horizontal alignment film and a liquid crystal material having positive dielectric anisotropy are used, the axially symmetrical alignment will be obtained in the voltage non-applied state. If liquid crystal molecules are aligned axially symmetrically at least in the voltage applied state, a wide viewing angle characteristic is obtained.

The configuration of the transparent wall structures 16 of the LCD of this embodiment and the behavior of the liquid crystal molecules existing in the vicinity of the wall structures 16 will be described.

Figure 4A:
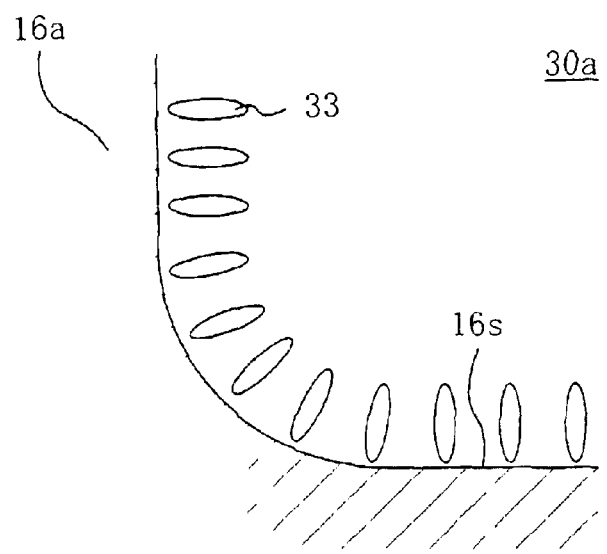
FIGS. 4A, 4B, 4C, and 4D are schematic views illustrating the orientation states of liquid crystal molecules in modeled liquid crystal regions of the LCD of the present invention.

FIG. 4A is an enlarged view of a portion near the corner 16a formed by the wall structures 16 shown in FIG. 1B, that is, a corner portion of the liquid crystal region 30a, viewed from the direction vertical to the substrate.

Figure 11A:
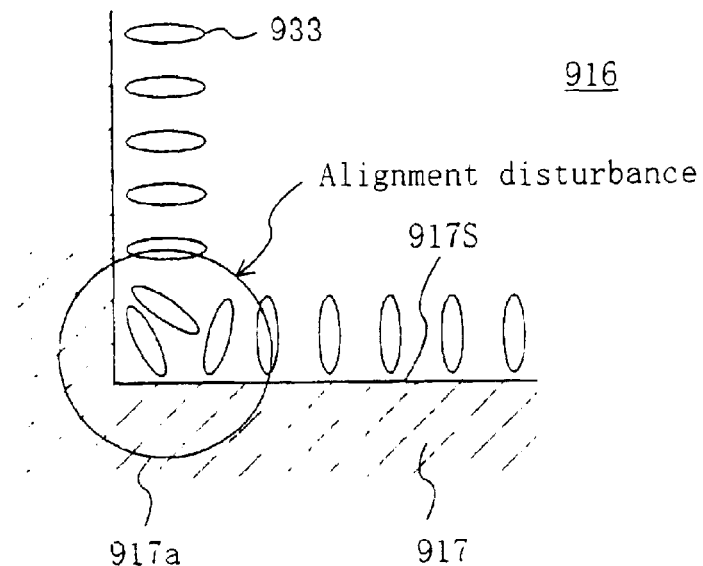
FIGS. 11A and 11B are plan views of a conventional ASM mode LCD, where FIG. 11A schematically illustrates the orientation state of liquid crystal molecules in a corner of a liquid crystal region.
Figure 11B:
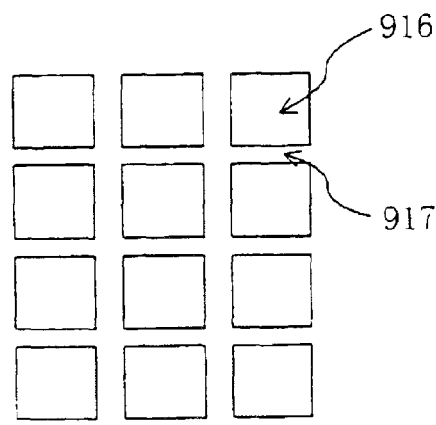

As shown in FIG. 4A, the liquid crystal molecules 33 are aligned vertical to side faces 16s of the wall structures 16 by the alignment regulating force of the vertical alignment film 18. In the conventional LCD shown in FIG. 11A, the alignment direction of the liquid crystal molecules 933 that is vertical to side faces 917s of the polymer walls 917 abruptly changes in the corner discontinuously, causing a disturbance in the alignment of the liquid crystal molecules near the corner. In the LCD 100 of this embodiment, the corner 16a of the polygon (typically a rectangle corresponding to each pixel) substantially surrounded by the wall structures 16 is dulled. In the illustrated example, the corner 16a has a shape of a curve. This allows the alignment of the liquid crystal molecules 33 near the corner to change continuously. Therefore, no alignment disturbance arises. That is, the axially symmetrical alignment of the liquid crystal molecules in the liquid crystal region is maintained stably in the corner. This advantageously prevents generation of roughness of display (variation in viewing angle characteristic) caused by an alignment disturbance in the corner. Such roughness of display is exhibited in the conventional LCD, especially significantly in the gray scale display. As a result, it is no more necessary to provide the black matrix for shading the alignment disturbance (or reducing the area of the openings of the black matrix), and thus bright display is realized. The effect of stabilizing the alignment by dulling the corners according to the present invention is especially significant for the construction where liquid crystal molecules are aligned vertical to the side faces of the wall structures. In the LCD using a vertical alignment film and a liquid crystal material having negative dielectric anisotropy, the display quality can be effectively improved by stabilizing the alignment of the liquid crystal molecules when the LCD is in the alignment state where a larger number of liquid crystal molecules are aligned horizontal to the substrate plane, that is, in the state ranging from the gray scale display state to the white display state. Therefore, high-contrast display is realized in the normally-black mode by using a vertical alignment film and a liquid crystal material having negative dielectric anisotropy.

As for the corner 16a of the region substantially surrounded by the wall structures 16, the size and shape requirements of the corner 16a for allowing the alignment of the liquid crystal molecules to change continuously depend on the liquid crystal material used. More specifically, the extent of change in the shape of the dulled corner 16a should be negligibly small compared with the size of the liquid crystal molecules. The shape and size of the dulled corner 16a will be described using simplified models shown in FIGS. 4B through 4D. Herein, the major-axis length of the liquid crystal molecules is referred to as the molecule length lm. The molecular length lm is about 20 nm, for example.

Figure 4B:
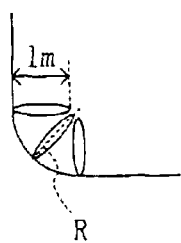
Figure 4C:
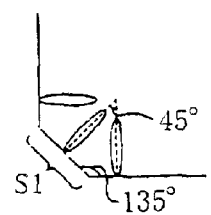
Figure 4D:
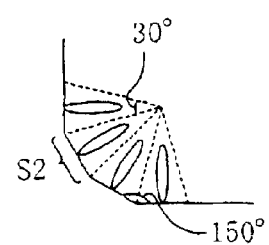

In the shape shown in FIG. 4B where the corner 16a has a shape of a curve having a radius R, the radius R must be roughly equal to or more than the molecule length lm in order to allow the alignment of the liquid crystal molecules to change continuously. In the shapes shown in FIGS. 4C and 4D where the corner 16a is constituted by a quarter of a regular polygon, a side S1 of the polygon must be roughly equal to or more than the molecule length lm when the interior angle is 135 degrees (FIG. 4C) and roughly a half or more of the molecule length lm when the interior angle is 150 degrees (FIG. 4D). In reality, the minor-axis length of the liquid crystal molecules also influences the alignment stability of the liquid crystal molecules. It will therefore be required to estimate larger values for the radium R and the sides S1 and S2 for realizing continuous alignment.

The method for fabricating the LCD 160 of this embodiment will be described in a concrete manner. The first substrate 100a was fabricated as follows. An ITO film was formed on the first transparent substrate 10 made of glass or the like and patterned to obtain the first transparent electrode 12 having a thickness of about 150 nm. An acrylic negative photosensitive resin (for example, CSP-S002 of Fuji Film Olin Co., Ltd.) was applied to the entire first transparent electrode 12 to a thickness of about 1.0 μm with a spin coater and prebaked at about 130° C. for about 120 seconds The resultant resin was then subjected to proximity light exposure via a photomask having a predetermined lattice pattern (having rectangular light-shading portions) and development. The light exposure was about 150 mJ/cm², which is excessive by 50% from a standard exposure, i.e., 100 mJ/cm². The standard exposure as used herein is an exposure required to obtain a resist pattern having the same shape as the mask pattern, that is, the shape reflecting the corners of the rectangles of the mask pattern. The development was done for about 60 seconds using CD of Fuji Film Olin Co., Ltd. according to standard development conditions. After rinsed and dried, the resultant substrate was subjected to one-hour post-baking at 230° C. Thus, the wall structures 16 (height: about 1 μm) that substantially surround the rectangular regions (corresponding to the liquid crystal regions 30a) having dulled corners were formed on the first transparent substrate 10. The taper angle of the wall structure 16 (angle defined by the side face of the wall structure 16 and the substrate plane) may be appropriately set. The size of one liquid crystal region was about 160 μx about 140 μm.

The taper angle of the wall structures 16 is preferably in the range of 10° to 90°. If the taper angle exceeds 90°, light leakage may be generated due to a disturbance of the alignment of liquid crystal molecules in the vicinity of the tapered wall structures, resulting in lowering the contrast ratio of display. Therefore, the taper angle is preferably not more than 90°. If the taper angle is less than 10° the alignment regulating force of the wall structures 16 exerted on the liquid crystal molecules may lower, resulting in failure of sufficient axially symmetrical alignment of the liquid crystal molecules. Therefore, the taper angle is preferably not less than 10°.

The height of the wall structures 16 is preferably not less than 0.5 μm. If it is less than 0.5 μm, the alignment regulating force may lower, thereby lowering the contrast ratio of display. In addition, the height of the wall structures 16 is preferably a half or less of the cell thickness (the distance between the substrates or the thickness of the liquid crystal layer) in consideration of easiness of the injection of the liquid crystal material. In particular, when the wall structures 16 are made of a transparent material, the height of the wall structures 16 is preferably about one-third or less of the cell thickness. If it exceeds about one-third of the cell thickness, the high aperture effect obtained by forming the wall structures 16 using a transparent material lowers.

In the illustrated example, the corners have a shape of a curve. Alternatively, a negative photosensitive resin may be patterned using a mask having polygonal light-shading portions having corners constituted by obtuse angles under the standard light exposure and development conditions. Otherwise, excessive light exposure may be done using a mask having polygonal light-shading portions having corners constituted by obtuse angles, to form wall structures providing corners having a shape of a curve. A positive photosensitive resin may also be used for the formation of the wall structures 16 having corners. However, using a negative photosensitive resin, the shape of the corners can be controlled more easily than using a positive photosensitive resin.

Thereafter, a photosensitive resin such as photosensitive polyimide was formed on the wall structures 16 and patterned by photolithography to form the column protrusions 20. The thickness of the photosensitive resin that corresponds to the height of the column protrusions 20 was about 5.0 μm (the cell gap is about 6.0 μm as the sum of the height of the wall structures of about 1.0 μm and the height of the column protrusions of about 5.0 μm). The vertical alignment film 18 was then formed by spin-coating JALS-204 (JSR Corp.) on the resultant first transparent substrate 10 including the first transparent electrodes 12, the wall structures 16, and the column protrusions 20.

The second substrate 100b was fabricated in the following manner. An ITO film was formed on the second transparent substrate 40 made of glass or the like and patterned to obtain the second transparent electrode 42 having a thickness of 150 nm. The vertical alignment film 48 was then formed by spin-coating JALS-204 (JSR Corp.) on the resultant second transparent substrate 40.

The thus-fabricated first and second substrates 100a and 100b are bonded together. The gap between the first and second substrates 100a and 100b is defined by the sum of the height of the wall structures 16 and the height of the column protrusions 20 of the first substrate 100a. In this embodiment, the cell gap was set at about 6 μm. An n-type liquid crystal material (a chiral agent is added so that 90-degree twist is obtained under Δε=−4.0, Δn=0.08, and the cell gap of 6 μm) is injected in the gap between the bonded first and second substrates 100a and 100b.

In the LCD 100 of this embodiment, liquid crystal molecules are preferably aligned axially symmetrically with respect to one center axis for each liquid crystal region 30a. In order to form one center axis for each liquid crystal region 30a, the following axially symmetrical alignment operation is preferably performed.

Figure 5:
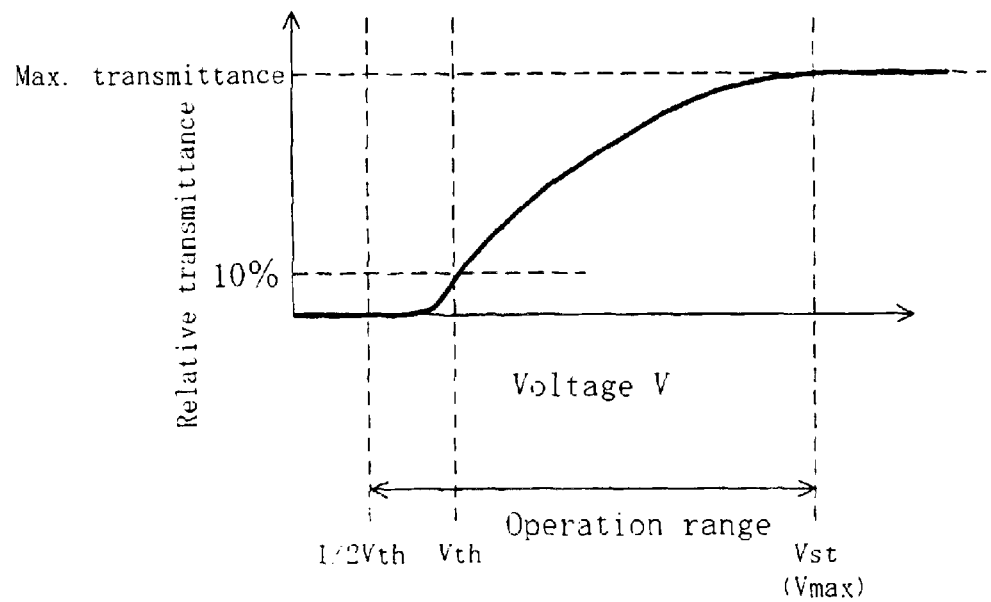
FIG. 5 is a graph roughly showing the voltage-transmittance characteristic of the LCD of the present invention.

When a liquid crystal material is merely injected in the gap between the substrates and a voltage is applied, a plurality of center axes may be formed in one liquid crystal region 30a, resulting in formation of a plurality of axially symmetrically aligned regions. If a plurality of center axes are formed in one liquid crystal region 30a, the liquid crystal material may in some cases exhibit different transmittances for the same voltage (i.e., exhibit hysteresis) between when the voltage rises and when it drops in the voltage-transmittance curve shown in FIG. 5. When a voltage is applied to the liquid crystal cell in which a liquid crystal material has been merely injected and the applied voltage is gradually raised, a plurality of center axes are initially formed. If a voltage equal to a half or more of a threshold voltage vth (voltage providing a relative transmittance of 10%) is continuously applied, the plurality of center axes are united into one for each liquid crystal region 30a defined by the wall structures 16. In view of this fact, it is preferable to perform the operation of applying a voltage equal to a half or more of the threshold voltage Vth as the axially symmetrical alignment operation. In addition, the LCD 100 of this embodiment is preferably driven with a voltage in the range from a half or more of the threshold voltage Vth to a saturation voltage Vst (voltage providing the maximum transmittance). If the driving voltage is less than a half of the threshold voltage Vth,.a plurality of center axes may be formed, resulting in unstable voltage-transmittance characteristic.

Figure 6:
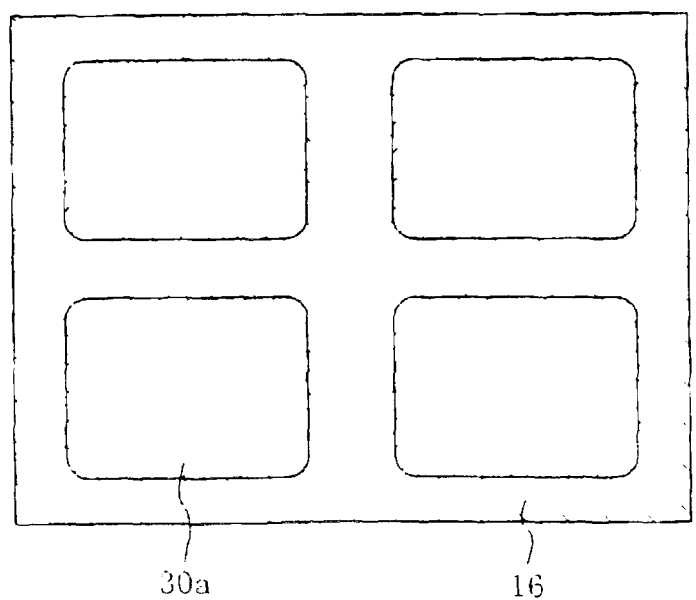
FIG. 6 is a schematic illustration of a liquid crystal cell in EMBODIMENT 1 as is observed with a polarizing microscope (crossed-Nicols).

The resultant liquid crystal regions 30a of the liquid crystal cell were observed in the voltage non-applied state in the transmittance mode with a polarizing microscope (crossed-Nicols). The results are schematically shown in FIG. 6. In the voltage non-applied state, the liquid crystal regions 30a exhibit a dark field (in the normally-black mode). Although the wall structures 16 and the liquid crystal regions 30a are schematically illustrated by different patterns in FIG. 6 to distinguish one from the other, the boundaries between the wall structures 16 and the liquid crystal regions 30a are indiscernible in the observation with the crossed-Nicols state polarizing microscope. In the gray scale display, there was observed no roughness of display or variation in viewing angle characteristic in each liquid crystal region 30a (especially in the corners).

Figure 7:
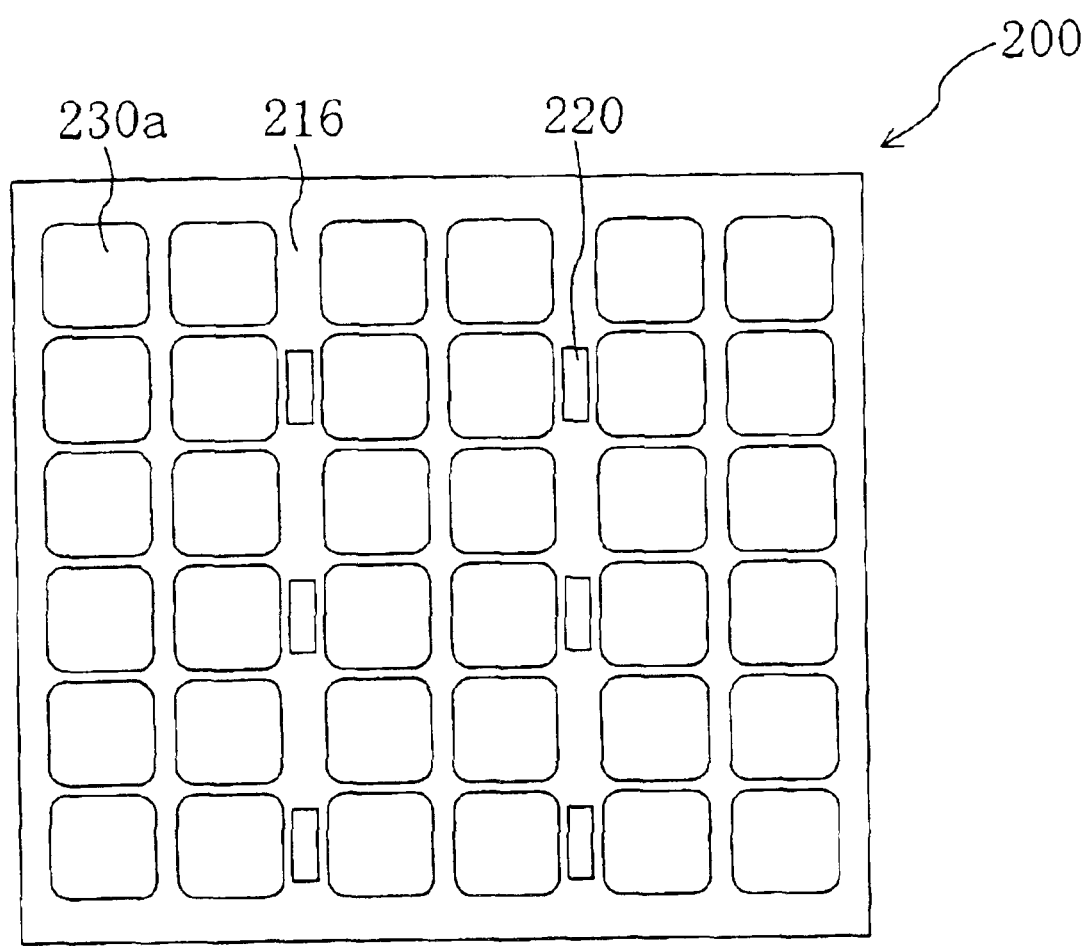
FIG. 7 is a plan view schematically illustrating an LCD of EMBODIMENT 2 of the present invention.
Figure 8A:
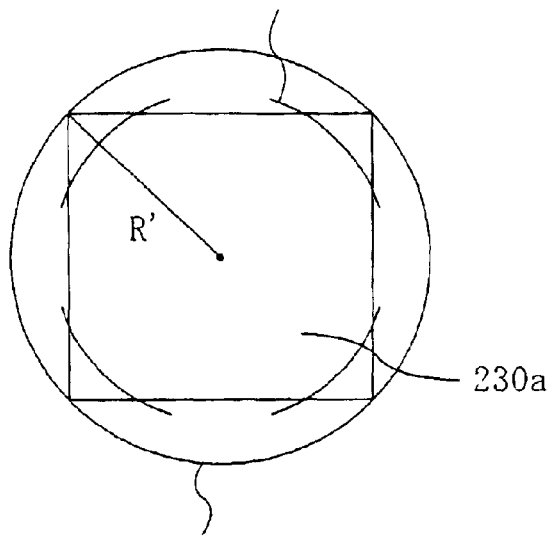
FIGS. 8A and 8B are schematic illustrations used to describe the shape of corners of a liquid crystal region of the LCD of EMBODIMENT 2.
Figure 8B:
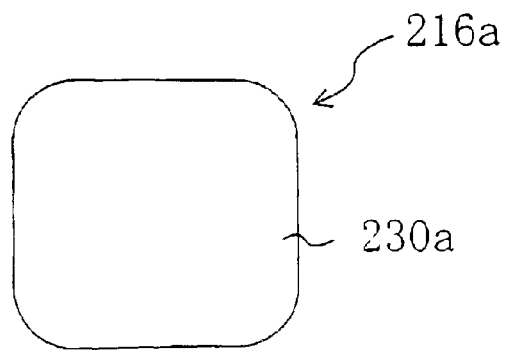
Figure 9:
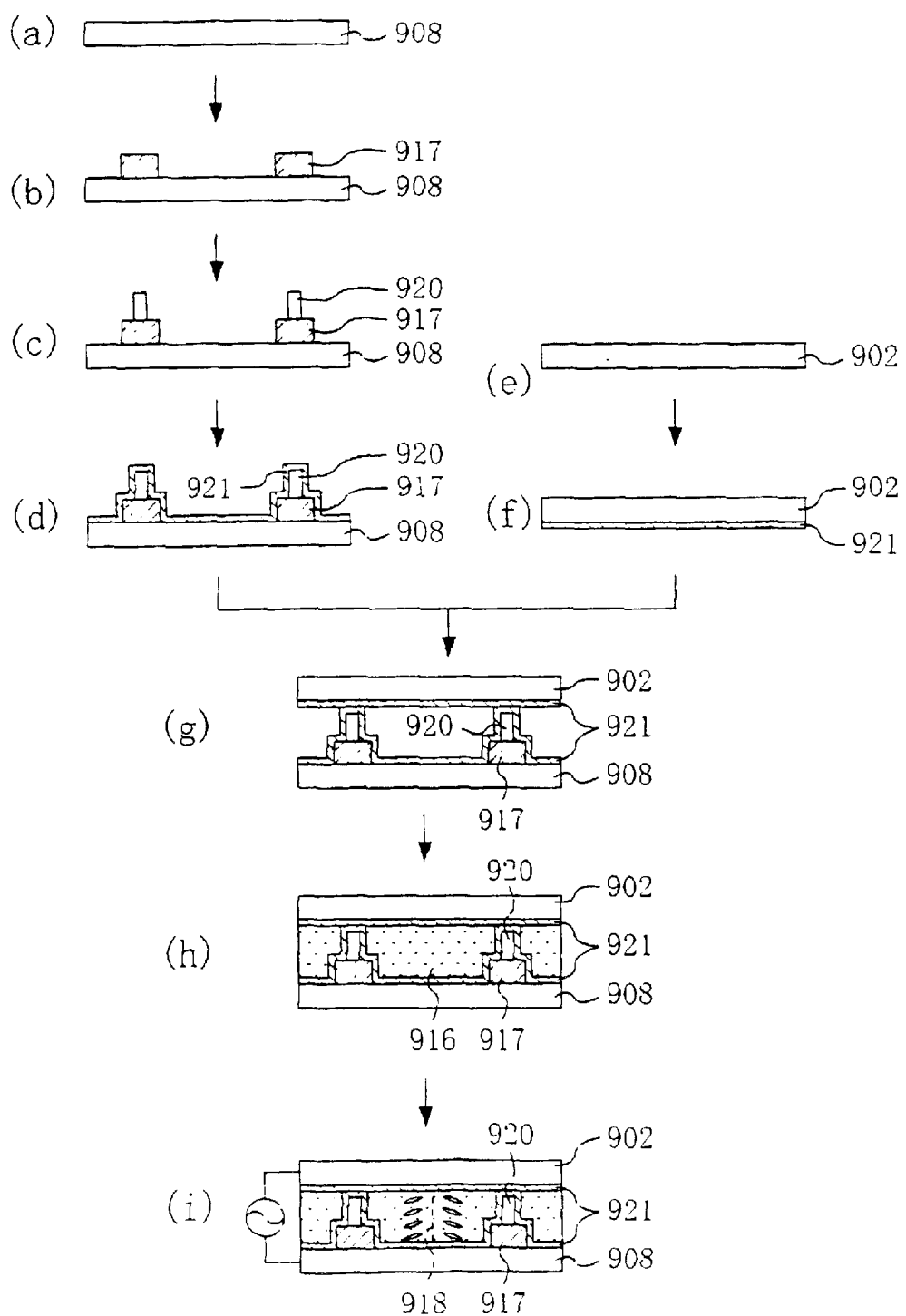
FIG. 9 illustrates the steps for fabricating a conventional ASM mode LCD.
Figure 10:
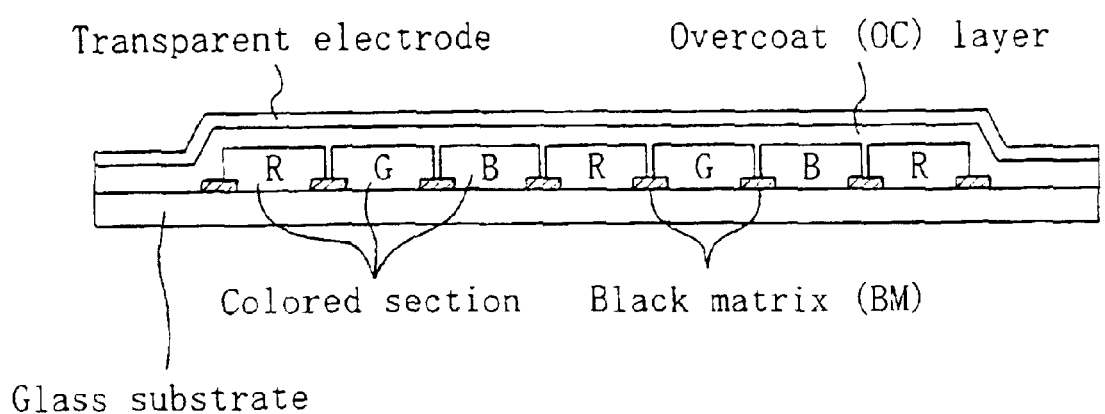
FIG. 10 is a cross-sectional view of a conventional color filter.

FIG. 7 is a plan view (viewed from the direction vertical to the substrate) of a liquid crystal display device (LCD) 200 of EMBODIMENT 2 of the present invention. FIGS. 8A and 8B are schematic illustrations of corners 216a of a liquid crystal region 230a of the LCD 200.

The LCD 200 is different from the LCD 100 of EMBODIMENT 1 in the shape of the corners 216a of the region substantially surrounded by wall structures 216. The corners 216a of the liquid crystal region 230a shown in FIG. 8B have a shape of a curve P having a radius of curvature not larger than a radius R' of a circle circumscribing a polygon of the liquid crystal region 230a as shown in FIG. 8A. If the polygon of the liquid crystal region 230a is not a regular polygon, the circle circumscribing a polygon as used herein refers to the circle having the smallest radius among the circles that are in contact with at least one corner of the polygon and include the entire polygon therein.

In the construction that the shape of the corners 216a is a curve having a radius of curvature not larger than the radius R' of a circle circumscribing a polygon of the liquid crystal region 230a, the alignment of liquid crystal molecules in the vicinity of the corners 216a changes continuously for the reason described in EMBODIMENT 1. This prevents occurrence of an alignment disturbance in the vicinity of the corners 216a and thus realizes high-quality display. As in EMBODIMENT 1, the radius of curvature R of the curve P constituting the shape of the corners 216a is preferably larger than the molecule length lm.

The shape of column protrusions 220 of the LCD 200 viewed from the direction normal to the display plane (rectangle) is different from that of the column protrusions of the LCD 100 (circle). The shape of the column protrusions and 220 is not restricted to those described above. The column protrusions 20 and 220 having appropriate shapes and areas may be formed at an appropriate density so that a sufficient strength is provided. The LCD 200 can be fabricated by substantially the same method as that for the LCD 100.

According to the present invention, in the ASM mode LCD, the corners of the liquid crystal regions substantially surrounded by the wall structures are dulled. Therefore, the alignment of the liquid crystal molecules changes continuously in the corners of the liquid crystal regions. This prevents occurrence of an alignment disturbance of liquid crystal molecules, and thus minimizes the variation in the viewing angle characteristic of display and eliminates the necessity of shading the alignment disturbance with the black matrix. As a result, there is obtained a liquid crystal display device having a wide viewing angle characteristic and providing bright, high-quality display free from roughness.

Moreover, according to the present invention, a negative photosensitive resin is subjected to excessive light exposure via a mask having polygonal light-shading portions to form the wall structures. By only this excessive light exposure, the corners of the regions substantially surrounded by the wall structures can be shaped into a curve. As a result, there is obtained a method for efficiently fabricating a liquid crystal display device having a wide viewing angle characteristic and providing bright, high-quality display free from roughness.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A liquid crystal display device comprising:
   a first substrate;
   a second substrate;
   a liquid crystal layer sandwiched by the first and second substrates; and
   wall structures supported by the first substrate and facing the liquid crystal layer for dividing the liquid crystal layer into a plurality of liquid crystal regions,
   wherein the wall structures surround and define the liquid crystal regions, each of a plurality of the regions having a shape of a polygon having dulled corners as viewed from above,
   wherein liquid crystal molecules in the liquid crystal regions are aligned vertically with respect to a surface of the wall structures, and an alignment direction of the liquid crystal molecules in the liquid crystal regions with respect to side faces of the wall structures in the corners chances continuously.

2. The device of claim 1, wherein the shape of the dulled corners is a curve.

3. The device of claim 1, wherein the shape of the dulled corners is a curve having a radius of curvature R, and the radius of curvature R has a relationship of R>lm wherein lm denotes a molecule length of the liquid crystal molecules in the liquid crystal regions.

4. The device of claim 3, wherein the radius of curvature R of the curve constituting the shape of the dulled corners has a relationship of R≦R' wherein R' denotes a radium of a circle circumscribing the polygon of the liquid crystal region.

5. The device of claim 1, wherein the wall structures are formed of a negative photosensitive resin.

6. The device of claim 1, wherein the liquid crystal molecules in the plurality of liquid crystal regions are aligned axially symmetrically with respect to an axis vertical to a surface of the first substrate.

7. A liquid crystal display device comprising:
   a first substrate;
   a second substrate;
   a liquid crystal layer located between at least the first and second substrates;
   at least one wall structure supported by the first substrate and facing the liquid crystal layer;
   wherein the wall structure surrounds a region having a shape of a polygon having dulled corners as viewed from above, so that an interior perimeter of a portion of the wall structure is in the shape of the polygon having dulled corners as viewed from above; and
   wherein liquid crystal molecules in the liquid crystal region are aligned vertically relative to a surface of the wall structure, and an alignment direction of the liquid crystal molecules in the liquid crystal region with respect to side faces of the wall structures in the corners changes continuously.

8. The device of claim 7, wherein the liquid crystal molecules are axially symmetrically aligned with respect to a vertical axis located in a central area of the region.

9. The device of claim 7, wherein the liquid crystal molecules are aligned axially symmetrically with respect to an axis vertical to a surface of the first substrate.

10. A liquid crystal display device comprising:
    a first substrate;
    a second substrate;
    a liquid crystal layer sandwiched by the first and second substrates;
    wall structures supported by the first substrate and facing the liquid crystal layer,
    wherein the wall structures are made of a transparent material, surround and define regions having a shape of a polygon having dulled corners as viewed from above, and
    wherein a height of the wall structures is about one third or less of a thickness of the liquid crystal layer.

11. The device of claim 10, wherein the shape of the dulled corners is a curve.

12. The device of claim 10, wherein the shape of the dulled corners is a curve having a radius of curvature R, and the radius of curvature R has a relationship of R>lm wherein lm denotes a molecule length of liquid crystal molecules in the regions.

13. The device of claim 12, wherein the radius of curvature R of the curve constituting the shape of the dulled corners has a relationship of R≧R' wherein R' denotes a radium of a circle circumscribing the polygon of the regions.

14. The device of claim 10, wherein the wall structures are formed of a negative photosensitive resin.

15. The device of claim 10, wherein liquid crystal molecules in the regions are aligned vertical to side faces of the wall structures.

16. The device of claim 10, wherein the wall structures divide the liquid crystal layer into a plurality of liquid crystal regions, wherein liquid crystal molecules in the plurality of liquid crystal regions are aligned axially symmetrically with respect to an axis vertical to a surface of the first substrate, and an alignment direction of liquid crystal molecules in the liquid crystal regions with respect to side faces of the wall structures in the corners changes continuously.

17. The liquid crystal display device of claim 10, wherein side faces of the at least one wall structure are inclined to a surface of the first substrate.

18. The liquid crystal display device of claim 10, wherein an angle of side faces of the at least one wall structure and a surface of the first substrate is/are in a range of about 10 to about 90 degrees.

19. The liquid crystal display device of claim 10, wherein a height of the at least one wall structure is no less than about 0.5 μm.

20. A liquid crystal display device comprising:
    a first substrate;
    a second substrate;
    a liquid crystal layer located between at least the first and second substrates;
    at least one wall structure supported by the first substrate and facing the liquid crystal layer;
    wherein the wall structure surrounds a region having a shape of a polygon having dulled corners as viewed from above, so that an interior perimeter of a portion of the wall structure is in the shape of the polygon having dulled corners as viewed from above;

wherein the wall structure is made of a transparent material; and a height of the wall structure is about one third or less than a thickness of the liquid crystal layer.

21. The device of claim 20, wherein liquid crystal molecules are located in the region and are axially symmetrically aligned with respect to a vertical axis located in a central area of the region.

22. The device of claim 20, wherein liquid crystal molecules in the region are aligned axially symmetrically with respect to an axis vertical to a surface of the first substrate, and an alignment direction of liquid crystal molecules in the region with respect to side faces of the wall structure in corners of the region changes continuously.

* * * * *